(12) United States Patent
Tamada et al.

(10) Patent No.: US 6,282,006 B1
(45) Date of Patent: Aug. 28, 2001

(54) OPTICAL COMMUNICATIONS APPARATUS AND METHOD

(75) Inventors: Hitoshi Tamada; Shuichi Matsumoto; Takashi Yamaguchi, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/109,388

(22) Filed: Jul. 2, 1998

(30) Foreign Application Priority Data

Jul. 3, 1997 (JP) .................................................. 9-178643

(51) Int. Cl.[7] .................................................. H04B 10/12
(52) U.S. Cl. .......................... 359/173; 359/152; 359/153; 385/36; 385/31; 385/124
(58) Field of Search ...................................... 359/188, 152, 359/173, 143, 163, 159, 153; 385/31, 33, 123, 124, 38, 36

(56) References Cited

U.S. PATENT DOCUMENTS

| | | | |
|---|---|---|---|
| 3,968,564 | * | 7/1976 | Springthorpe ............................ 29/580 |
| 4,216,486 | * | 8/1980 | Geddes ..................................... 357/19 |
| 4,712,096 | * | 12/1987 | Cholin et al. ........................ 340/590 |
| 5,737,108 | * | 4/1998 | Bunch et al. .......................... 359/152 |

* cited by examiner

Primary Examiner—Leslie Pascal
Assistant Examiner—Chau Minh Nguyen
(74) Attorney, Agent, or Firm—Sonnenschein, Nath & Rosenthal (57) ABSTRACT

An optical communications apparatus and method of using same in which optical coupling between an optical medium and a light emitter and a light receptor is achieved without any optical system therebetween. A minor axis of light transmission pattern on an end face of the optical fiber corresponds to the radial direction of the end face while a center C of the light emitter is displaced off from a center axis O, thereby providing improved optical coupling efficiencies.

20 Claims, 5 Drawing Sheets

FIG.1

RELATED ART

OPTICAL COMMUNICATIONS APPARATUS AND METHOD

BACKGROUND OF THE INVENTION

1. Field of the Invention

The present invention relates to an apparatus and a method utilized in optical communications using an optical transmission medium.

2. Description of the Related Art

Optical communications utilizing optical fibers have been carried out for increasing data transmission speed between computers, between a computer and its peripherals or between other digital devices. For such optical communications utilizing optical fibers, the two-fiber bidirectional communications scheme is generally used wherein two optical fibers are used. However, an apparatus for implementing the two-fiber bidirectional communications scheme is required to have a large configuration and the cost of the apparatus is high since two optical fibers are required and a device size of means for emitting signal light and so on is large.

Therefore, the single-fiber bidirectional communications scheme has been developed wherein a single optical fiber is used. An optical transmitter-receiver will now be described as an example of an optical communications apparatus used for the single-fiber bidirectional communications. The optical transmitter-receiver is coupled to a tip of an optical fiber and transmits and receives signal light.

Figure 1:
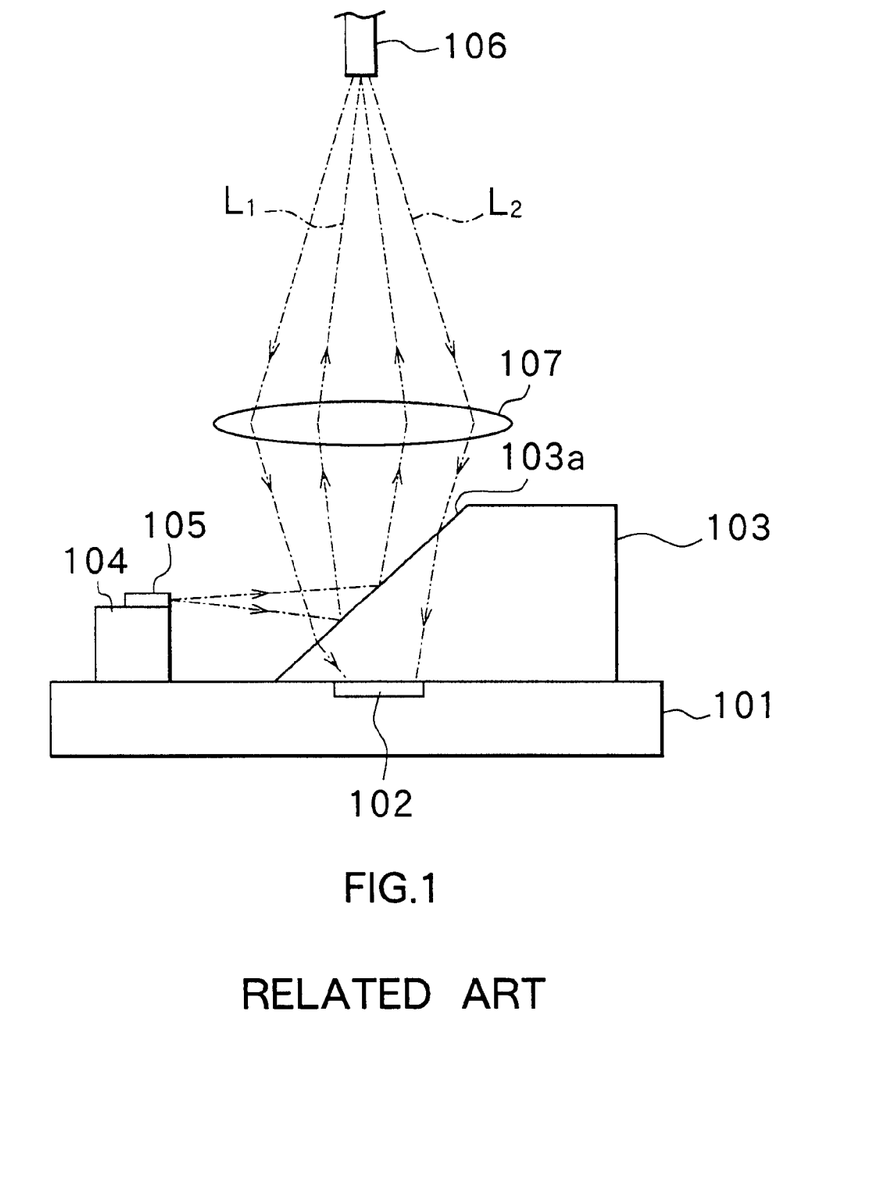
FIG. 1 illustrates the configuration of an optical transmitter-receiver as an example of an optical communications apparatus of related art.

FIG. 1 shows an example of the optical transmitter-receiver used for the single-fiber bidirectional communications. FIG. 1 is a side view of the main part of the optical transmitter-receiver. The transmitter-receiver comprises: a semiconductor substrate 101 formed of silicon semiconductor or gallium arsenide (GaAs) semiconductor and in an upper surface of which a photodiode 102 as a light receiving means is formed; a prism 103 joined to the surface of the substrate 101; a semiconductor device 104 in the shape of rectangular solid joined to the surface of the substrate 101; a laser diode 105 as a light emitting means joined to the top of the semiconductor device 104; and a lens 107 for allowing first signal light $L_1$ emitted from the laser diode 105 to be sent to another optical transmitter-receiver to enter an end face of an optical fiber 106 as a communications line and for condensing second signal light $L_2$ sent from the other transmitter-receiver through the optical fiber 106 and emitted from the end face of the optical fiber 106 and introducing second signal light $L_2$ to the photodiode 102.

On the substrate 101 the prism 103 is placed on the photodiode 102. The semiconductor device 104 is placed on a side of the prism 103. The laser diode 105 is arranged such that first signal light $L_1$ is emitted towards the prism 103. The prism 103 has a slope forming an angle of 45 degrees with the upper surface of substrate 101, for example, on a side thereof facing the laser diode 105. A half mirror 103a is formed on the slope. For the optical fiber 106, a large-diameter plastic fiber may be used.

In the optical transmitter-receiver with such a configuration, the laser diode 105 is driven by a drive circuit not shown and first signal light $L_1$ is emitted from the laser diode 105. First signal light $L_1$ enter the half mirror 103a of the prism 103 with a numerical aperture (NA) of 0.1, for example, where nearly 50 percent of quantity of light, for example, is reflected to enter the lens 107. First signal light $L_1$ is condensed by the lens 107 and enters the optical fiber 106 with a numerical aperture of 0.1, for example. An numerical aperture of first signal light $L_1$ emitted from the laser diode 105 depends on the laser diode 105.

On the other hand, second signal light $L_2$ sent from the other optical transmitter-receiver through the optical fiber 106 is emitted from the optical fiber 106 with a numerical aperture of 0.3, for example. Second signal light $L_2$ is condensed by the lens 107 so that the numerical aperture is 0.3 and enters the half mirror 103a of the prism 103. Nearly 50 percent of quantity of light passes through to enter the photodiode 102. The light is then transformed to an electric signal. An numerical aperture of second signal light $L_2$ emitted from the optical fiber 106 depends on the optical fiber 106.

In the optical transmitter-receiver shown in FIG. 1 as an example of optical communications apparatus, however, nearly 50 percent of quantity of light is lost in each of first signal light $L_1$ and second signal light $L_2$. Therefore an optical coupling efficiency and a light receiving efficiency are reduced. In the related art techniques as described so far, it is difficult to improve both light coupling efficiency of a light emitting means such as a laser diode to an optical fiber and light receiving efficiency of a light receiving means such as a photodiode for receiving signal light.

Another problem in the related art techniques is difficulty in removing stray light components, that is, signal light generated by a light emitting means reflecting off an end face of an optical fiber and entering a light receiving means. Such stray light components affect optical communications.

Furthermore, an optical system including an image-formation lens is placed between light emitting and receiving means and an optical fiber in related art techniques. Consequently the number of parts included in the apparatus increases and the configuration of the apparatus is complicated and large in size.

SUMMARY OF THE INVENTION

It is an object of the invention to provide an optical communications apparatus and an optical communications method for achieving a simple and small-sized configuration and improving optical coupling efficiency of a light emitting means to an optical transmission medium and so on to achieve satisfactory optical communications.

An optical communications apparatus of the invention comprises a light emitting means for emitting signal light for optical communications incident off a center axis of an end face of an optical transmission medium. The light emitting means may provide direct optical coupling to the optical transmission medium without an optical system.

In another optical communications apparatus of the invention, one edge of a light receiving means is placed between an incident point of signal light from a light emitting means on an end face of an optical transmission medium and a center axis of the end face.

According to a method of optical communications of the invention, a light emitting means emits signal light incident off a center axis of an end face of an optical transmission medium.

According to the optical communications apparatus of the invention, the light emitting means emits signal light for optical communications incident off the center axis of the end face of the optical transmission medium.

In the other optical communications apparatus of the invention, one edge of the light receiving means is placed between the incident point of signal light from the light emitting means on the end face of the optical transmission medium and the center axis of the end face.

The method of optical communications of the invention allows the light emitting means to emit signal light incident off the center axis of the end face of the optical transmission medium.

Other and further objects, features and advantages of the invention will appear more fully from the following description.

DETAILED DESCRIPTION OF THE PREFERRED EMBODIMENT

A preferred embodiment of the invention will now be described in detail with reference to the accompanying drawings.

Figure 2:
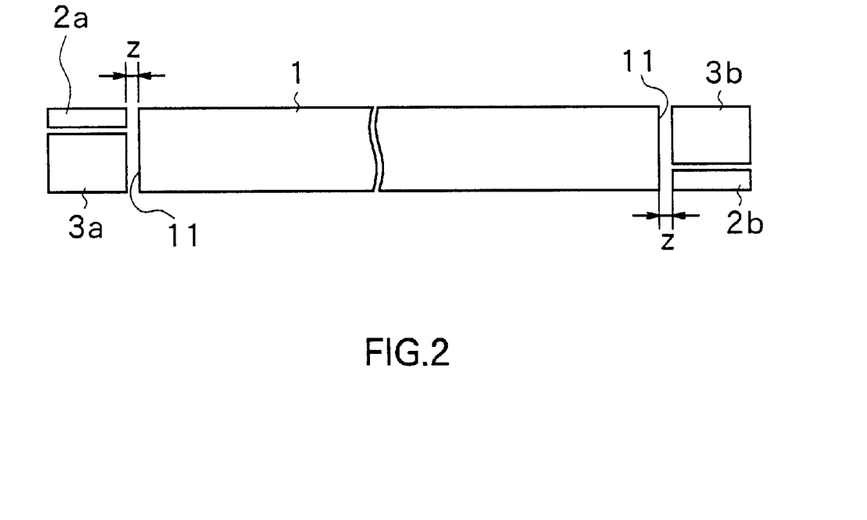
FIG. 2 illustrates the configuration of an optical communications apparatus of an embodiment of the invention.

FIG. 2 is a schematic view illustrating the configuration of an optical communications apparatus of an embodiment of the invention. An optical communications method of the invention which is implemented with the apparatus will be described in conjunction with description of the apparatus.

The optical communications apparatus of the embodiment is provided for single-fiber bidirectional communications. As shown in FIG. 2, the apparatus comprises an optical fiber 1 as an optical transmission medium and light emitters 2a and 2b and light receptors 3a and 3b placed at both ends of the optical fiber 1.

In the optical communications apparatus of the embodiment, the light emitter 2a and the light receptor 3a are provided at one end of the optical fiber 1 and the light emitter 2b and the light receptor 3b at the other end. Signal light emitted from the light emitter 2a enters the one end of the optical fiber 1 to be received at the light receptor 3b placed at the other end of the optical fiber 1. Similarly, signal light emitted from the light emitter 2b enters the other end of the optical fiber 1 to be received at the light receptor 3a placed at the one end of the optical fiber 1. In such a manner bidirectional communications are carried out between both ends of the optical fiber 1.

The optical fiber 1 may be either a step index fiber or a graded index fiber. The core diameter of the optical fiber 1 is of the order of 1 mm. However, the diameter is not limited to 1 mm but may be of the order of 50 $\mu$m as long as the optical fiber 1 is a multimode fiber.

The light emitters 2a and 2b and the light receivers 3a and 3b are each placed at distance 'z' (10 $\mu$m or above, for example) from an end face 11 of the optical fiber 1 and placed such that optical coupling is achieved directly to the end face 11 without an optical system such as an image-formation lens. Consequently, optical coupling of divergent light is achieved between the optical fiber 1 and the light emitters 2a and 2b, for example. This reduces the percentage of return light, that is, signal light emitted from the light emitters 2a and 2b reflecting off the end face 11 and returning back to the light emitters 2a and 2b. As a result, unstable operations of the light emitters 2a and 2b due to such return light will be prevented. To be specific, the percentage of light returning to the light emitters 2a and 2b is 0.04 percent where the light emitters 2a and 2b are placed 50 $\mu$m away from the end face 11. The percentage is reduced down to 0.01 percent where the light emitters 2a and 2b are placed 100 $\mu$m away. Stable operations of the light emitters 2a and 2b are thus achieved by placing the light emitters 2a and 2b at distance 'z' from the end face 11 of the optical fiber 1 without an optical system in between.

The light emitters 2a and 2b may be made up of semi-conductor lasers such as horizontal resonance type normal radiation lasers. The light emitters 2a and 2b allow signal light consisting of laser light to enter in a position off the center axis of the end face 11 of the optical fiber 1. The light receptors 3a and 3b may be made up of photodiodes capable of receiving signal light consisting of laser light emitted from the light emitters 2a and 2b. The light receptors 3a and 3b are placed at a specific distance from the light emitters 2a and 2b wherein the distance reduces the percentage of incident stray light components produced by signal light emitted from the light emitters 2a and 2b reflecting off the end face 11 of the optical fiber 1. The light emitters 2a and 2b correspond to light emitting means of the invention. The light receptors 3a and 3b correspond to light receiving means of the invention.

The relationship among the positions of the light emitters 2a and 2b, the light receptors 3a and 3b and the end face 11 of the optical fiber 1 will now be described in detail.

Figure 3:
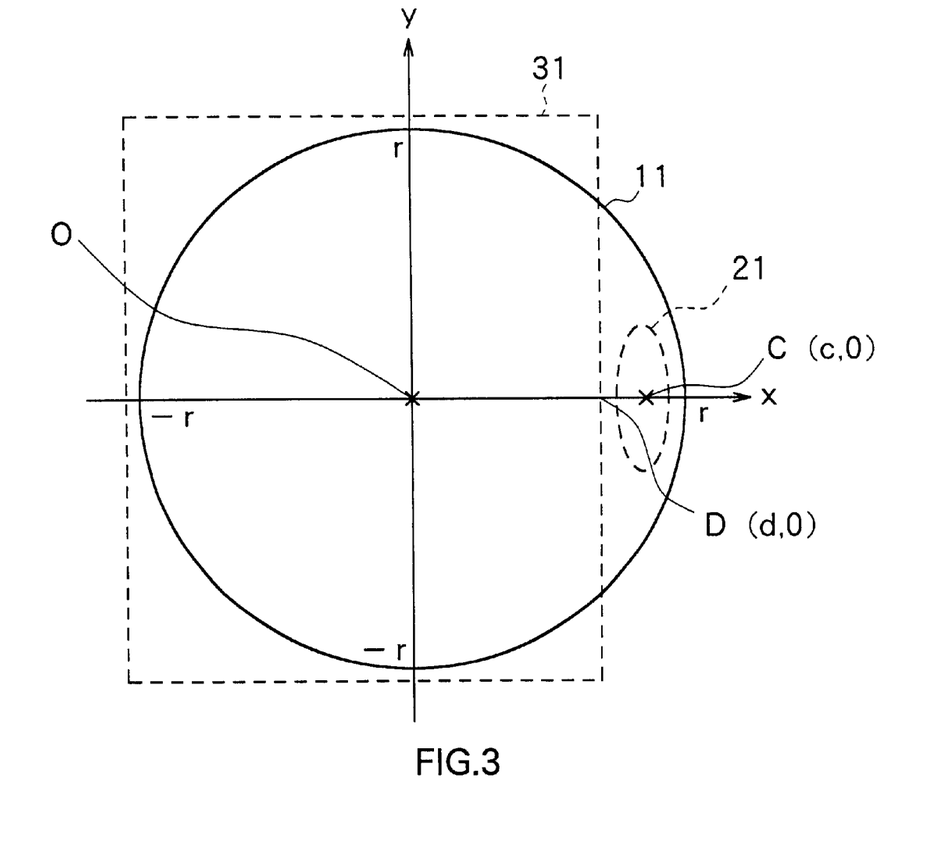
FIG. 3 shows an arrangement of components of the optical communications apparatus shown in FIG. 2.

FIG. 3 illustrates the relationship among the positions of the light emitters 2a and 2b, the light receptors 3a and 3b and the end face 11. FIG. 3 shows the core of the end face 11 only where 'r' is the core radius and 'O' is the center axis of the end face 11. The relationship between the positions of the light emitters 2a and 2b and the light receptors 3a and 3b will now be described, using x and y coordinate axes orthogonal to each other with center axis O of the end face 11 as the origin (0, 0) in FIG. 3.

As shown in FIG. 3, the light emitters 2a and 2b emit signal light so as to form a light emission pattern 21 taking a non-circular shape such as an ellipse on the end face 11 of the optical fiber 1. Center C of the signal light emitted is off center axis O of the end face 11. To be specific, as shown in FIG. 3, the minor axis of the non-circular light emission pattern 21 corresponds to x axis in the core region of the end face 11. In addition, the position of center C is (c, 0) on x axis which is off center axis O. Effects such as an improvement in optical coupling efficiency are thus achieved by emitting non-circular signal light and having center C enter a position off center axis O of the end face 11 (a position within the core region of the end face 11). Effects of the relationship between the positions will be described in detail later on.

As shown in FIG. 3, the light receptors 3a and 3b are each placed with respect to the end face 11 such that a light receiving area 31 in a rectangular shape, for example, of the light receptors 3a and 3b does not overlap the light emission pattern 21 of the light emitters 2a and 2b and the light receiving area 31 covers almost all the region corresponding to the core of the end face 11. A point on an edge of the light receiving area 31 (that is, edge position D at the intersection of x axis and the right edge of the light receiving area 31) is located at a point (d, 0) between the light emission pattern 21 and center axis O of the end face 11. Edge position D of the light receiving area 31 is placed at a specific distance from the light emitters 2a and 2b wherein the distance reduces the percentage of incident stray light components produced by signal light emitted from the light emitters 2a and 2b reflecting off the end face 11 of the optical fiber 1. The relationship between the distance and the percentage of incident stray light and so on will be described in detail later on.

Referring to FIG. 4 to FIG. 7, the relationship among the positions of the light emitters 2a and 2b, the light receptors 3a and 3b and the end face 11 of the optical fiber 1 will now be described, mainly on effects of the relationship on the apparatus. FIG. 4 to FIG. 7 are plots for illustrating a relationship between optical coupling efficiencies and optical coupling positions of the light emitters 2a and 2b and so on. The results obtained are shown wherein the optical fiber 1 with core radius 'r' of 0.5 mm and an NA of 0.25 is used and the light emitters 2a and 2b are semiconductor lasers producing a beam with wavelength $\lambda$ of 0.8 $\mu$m whose beam geometry near the emission point is elliptic and whose major axis radius of beam diameter is 2 $\mu$m and minor axis 0.6 $\mu$m.

Figure 4:
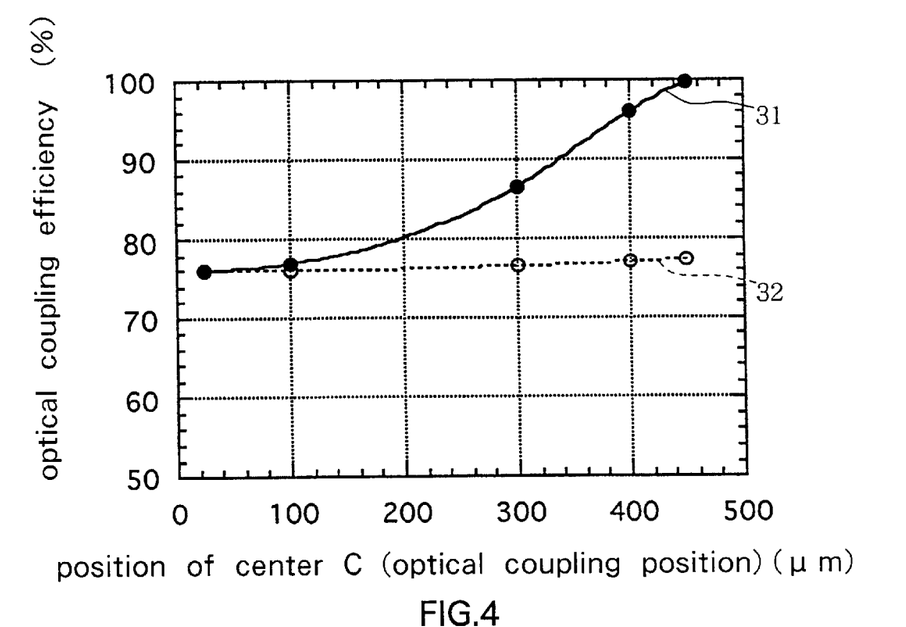
FIG. 4 is a plot for indicating a relationship between optical coupling efficiencies and optical coupling positions of the light emitter in FIG. 2 wherein a step index fiber is used.
Figure 5:
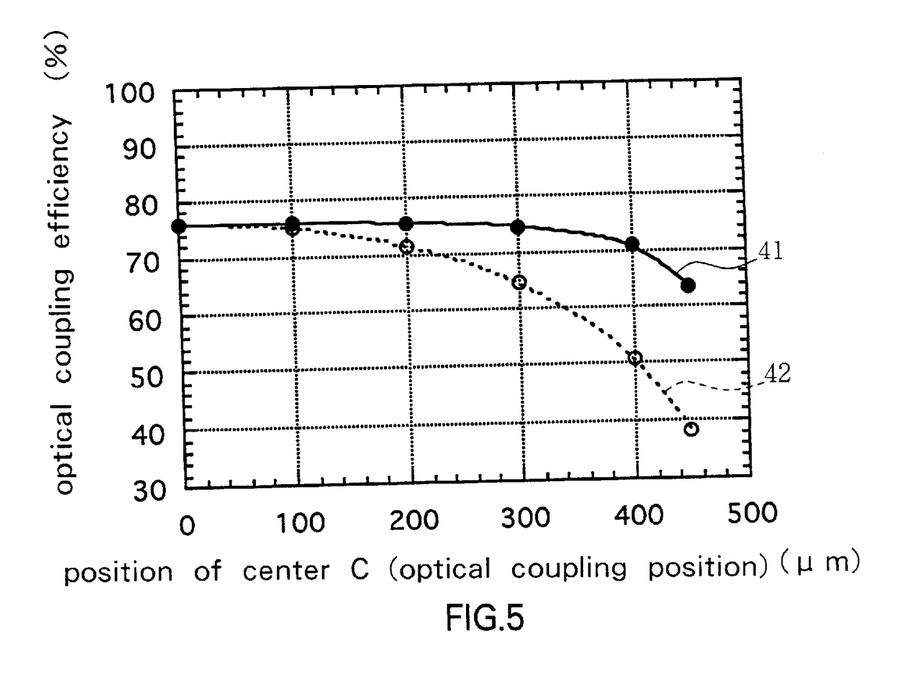
FIG. 5 is a plot for indicating a relationship between optical coupling efficiencies and optical coupling positions of the light emitter in FIG. 2 wherein a graded index fiber is used.

FIG. 4 and FIG. 5 are plots for indicating a relationship between optical coupling efficiencies and optical coupling positions of the light emitters 2a and 2b. The vertical axis indicates optical coupling efficiencies (%). The horizontal axis indicates positions of center C as optical coupling positions ($\mu$m) which are values of center C on x axis in FIG. 3, corresponding to a distance from center axis O. FIG. 4 shows the results obtained with a step index fiber used for the optical fiber 1. FIG. 5 shows the results obtained with a graded index fiber used for the optical fiber 1. A graph 31 in FIG. 4 and a graph 41 in FIG. 5 show optical coupling efficiencies where the minor axis of the light emission pattern 21 on the end face 11 of the optical fiber 1 in FIG. 3 corresponds to the radial direction from center axis O of the end face 11 (that is, the x direction in FIG. 3. The same applies to the following description). A graph 32 in FIG. 4 and a graph 42 in FIG. 5 show optical coupling efficiencies where the major axis of the light emission pattern 21 on the end face 11 in FIG. 3 corresponds to the radial direction of the end face 11.

In FIG. 4, the graph 32 indicates that optical coupling efficiencies are maintained around 76 percent regardless of optical coupling positions (positions of center C in FIG. 3) where the major axis of the light emission pattern 21 in FIG. 3 corresponds to the radial direction of the end face 11. In contrast, the graph 31 indicates that optical coupling efficiencies increase with increases in distance between optical coupling positions and center axis O where the minor axis of the light emission pattern 21 corresponds to the radial direction of the end face 11. In particular, almost 100 percent of optical coupling efficiency is achieved when a distance between the position of center C and center axis O is 450 $\mu$m. With a step index fiber used for the optical fiber 1, an optical coupling efficiency is thus improved by having the minor axis of the light emission pattern 21 on the end face of the optical fiber 1 correspond to the radial direction of the end face 11 and keeping a distance between the optical coupling position and center axis O.

In FIG. 5, both graph 41 wherein the minor axis of the light emission pattern 21 corresponds to the radial direction of the end face 11 and graph 42 wherein the major axis of the light emission pattern 21 corresponds to the radial direction of the end face 11 indicate downward slopes. Both graphs 41 and 42 indicate that optical coupling efficiencies decrease with increases in distance between center C and center axis O. However, the graph 41 indicates higher optical coupling efficiencies throughout compared to the graph 42. For example, when the distance between the optical coupling position and center axis O is no more than 450 $\mu$m, the optical coupling efficiency is 63 percent in the graph 41 and 38 percent in the graph 42. As thus described, with a graded index fiber used for the optical fiber 1, the optical coupling efficiency is improved by having the minor axis of the light emission pattern 21 on the end face 11 of the optical fiber 1 correspond to the radial direction of the end face 11. However, the optical coupling efficiency is not improved by keeping a distance between the optical coupling position and center axis O as with a step index fiber (FIG. 4).

As indicated by the graphs in FIG. 4 and FIG. 5, optical coupling efficiencies of the light emitters 2a and 2b are improved by having the minor axis of the light emission pattern 21 on the end face 11 of the optical fiber 1 correspond to the radial direction of the end face 11 and keeping a distance between the optical coupling position and center axis O.

Figure 6:
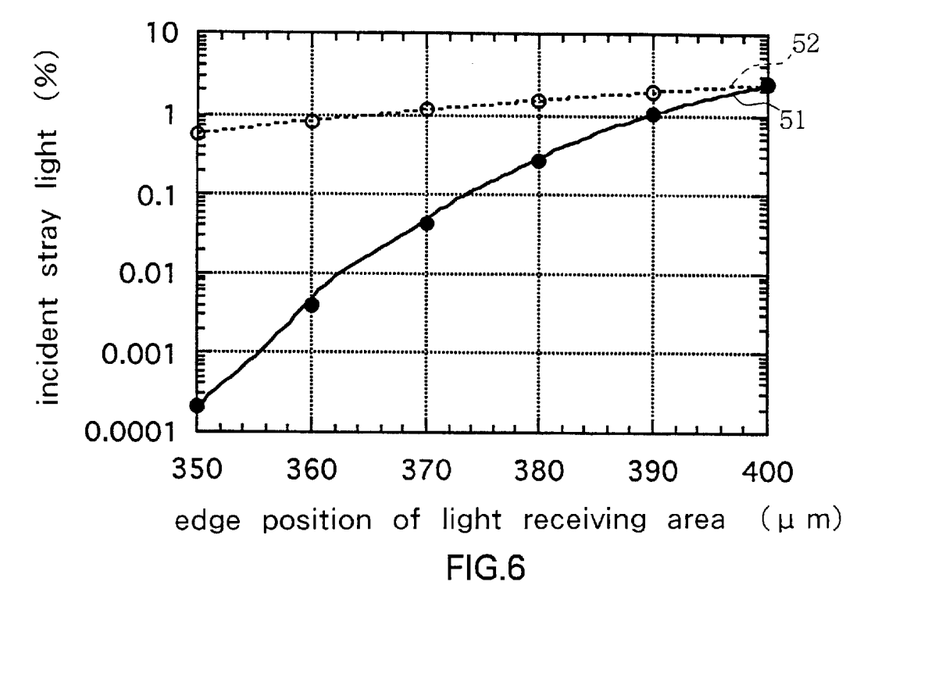
FIG. 6 is a plot for indicating a relationship between edge positions of a light receiving area of the light receptor in FIG. 2 and percentages of incident stray light.

FIG. 6 is a plot for indicating a relationship between edge positions D of the light receiving area 31 of the light receptors 3a and 3b in FIG. 3 and percentages of incident stray light, that is, signal light from the light emitters 2a and 2b reflecting off the end face 11 of the optical fiber 1 and entering the light receptors 3a and 3b. The vertical axis indicates percentages of incident stray light (%). The horizontal axis indicates edge positions D of the light receiving area 31 ($\mu$m) which are values of edge positions D on x axis in FIG. 3, corresponding to a distance from center axis O. FIG. 6 shows the results obtained with the optical fiber 1 without reflection reducing coating on the end face 11. The results are obtained with the light emitters 2a and 2b placed at a distance of no more than 100 $\mu$m from the end face 11 (in the direction of 'z' in FIG. 2) and the position of center C off center axis O of the end face 11 by no more than 400 $\mu$m. A graph 51 shows the relationship wherein the minor axis of the light emission pattern 21 on the end face 11 in FIG. 3 corresponds to the radial direction of the end face 11. A graph 52 shows the relationship wherein the major axis of the light emission pattern 21 on the end face 11 corresponds to the radial direction of the end face 11.

As shown in FIG. 6, the percentages of stray light incident on the light receptors 3a and 3b are low, that is, a stray light reducing effect is enhanced wherein the minor axis of the light emission pattern 21 on the end face 11 corresponds to the radial direction of the end face 11. It is also noted that stray light incident on the light receptors 3a and 3b is reduced to a negligible degree (the incident stray light percentage of approximately 0.0002 percent) by placing edge position D of the light receiving area 31 at a distance of no more than 50 $\mu$m (at a distance of 350 $\mu$m from center axis O) from center C of the light emitters 2a and 2b (at a distance of 400 $\mu$m from center axis O).

Figure 7:
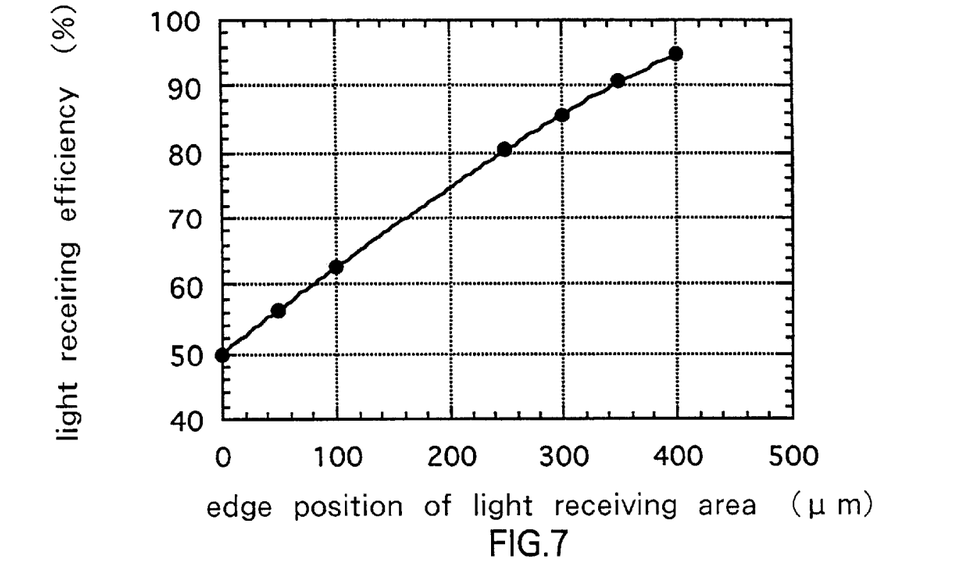
FIG. 7 is a plot for indicating a relationship between edge positions of the light receiving area and light receiving efficiencies of the light emitter in FIG. 2.

FIG. 7 is a plot for indicating a relationship between edge positions D of the light receiving area 31 of the light receptors 3a and 3b in FIG. 2 and percentages of light receiving efficiencies. The vertical axis indicates percentages of light receiving efficiencies. The horizontal axis indicates edge positions D of the light receiving area 31 (μm) which are values of edge positions D on x axis in FIG. 3, corresponding to a distance from center axis O. The light receiving efficiency means a percentage of signal light transmitted on the optical fiber 1 and emitted from the end face 11 of the optical fiber 1 to be received by the light receptors 3a and 3b.

As shown in FIG. 7, light receiving efficiencies increase with increases in distance between edge position D of the light receiving area 31 of the light receptors 3a and 3b and center axis O of the end face 11 of the optical fiber 1. For example, the light receiving efficiency reaches 90 percent when edge position D is placed at a distance of 350 μm from center axis O.

All the results shown in FIG. 4 to FIG. 7 considered, satisfactory properties are obtained, including a optical coupling efficiency to the optical fiber 1 of approximately 90 percent, a light receiving efficiency of the light receptors 3a and 3b of approximately 90 percent and a percentage of stray light incident on the light receptors 3a and 3b of approximately 0.0002 percent, a Fresnel loss on the end face 11 taken into account. The conditions for obtaining these properties are: center C of the light emitters 2a and 2b placed at a distance of 400 μm from center axis O; edge position D of the light receiving area 31 of the light receptors 3a and 3b placed at a distance of 350 μm from center axis O and the minor axis of the light emission pattern 21 on the end face 11 of the optical fiber 1 corresponding to the radial direction of the end face 11.

According to the optical communications apparatus and method of the embodiment described so far, optical coupling is achieved between the optical fiber 1 and the light emitters 2a and 2b and the light receptors 3a and 3b without an optical system such as an image-formation lens in between. As a result, the configuration of the apparatus is simplified and the size is reduced. Since the light emitters 2a and 2b are placed at a specific distance from the end face 11 of the optical fiber 1 without an optical system in between, the percentage of return light, that is, signal light emitted from the light emitters 2a and 2b reflecting off the end face 11 and returning to the light emitters 2a and 2b, is reduced. Stable operations of the light emitters 2a and 2b are thereby achieved.

According to the optical communications apparatus and method of the embodiment, the minor axis of the light emission pattern 21 on the end face 11 of the optical fiber 1 corresponds to the radial direction of the end face 11 and center C of the light emitters 2a and 2b is placed off center axis O. As a result, optical coupling efficiencies are improved between the light emitters 2a and 2b and the optical fiber 1. Furthermore, edge position D of the light receiving area 31 of the light receptors 3a and 3b is placed between the light emission pattern 21 and center axis O of the end face 11 and edge position D is placed at such a distance from the light emitters 2a and 2b that incident stray light is reduced. Light receiving efficiencies are thus improved by reducing stray light incident on the light receptors 3a and 3b.

The embodiment of the invention thus achieves simplification and downsizing of the apparatus and improves optical coupling efficiencies of signal light from the light emitters 2a and 2b and light receiving efficiencies of signal light by the light receptors 3a and 3b at the same time. Optical communications are thereby performed in satisfactory condition.

EXAMPLE

A specific example to which the present invention is applied will now be described. In the following description like numerals are assigned to components similar to those of the optical communications apparatus of the foregoing embodiment and description thereof is omitted.

In the optical communications apparatus described in the foregoing embodiment, the light emitters 2a and 2b and the light receptors 3a and 3b may be formed through monolithic or hybrid integration.

When monolithic integration is utilized, for example, the configuration of each of the light emitters 2a and 2b and each of the light receptors 3a and 3b are implemented on a single semiconductor substrate. The optical communications apparatus of the invention implemented through such monolithic integration will now be described.

Figure 8:
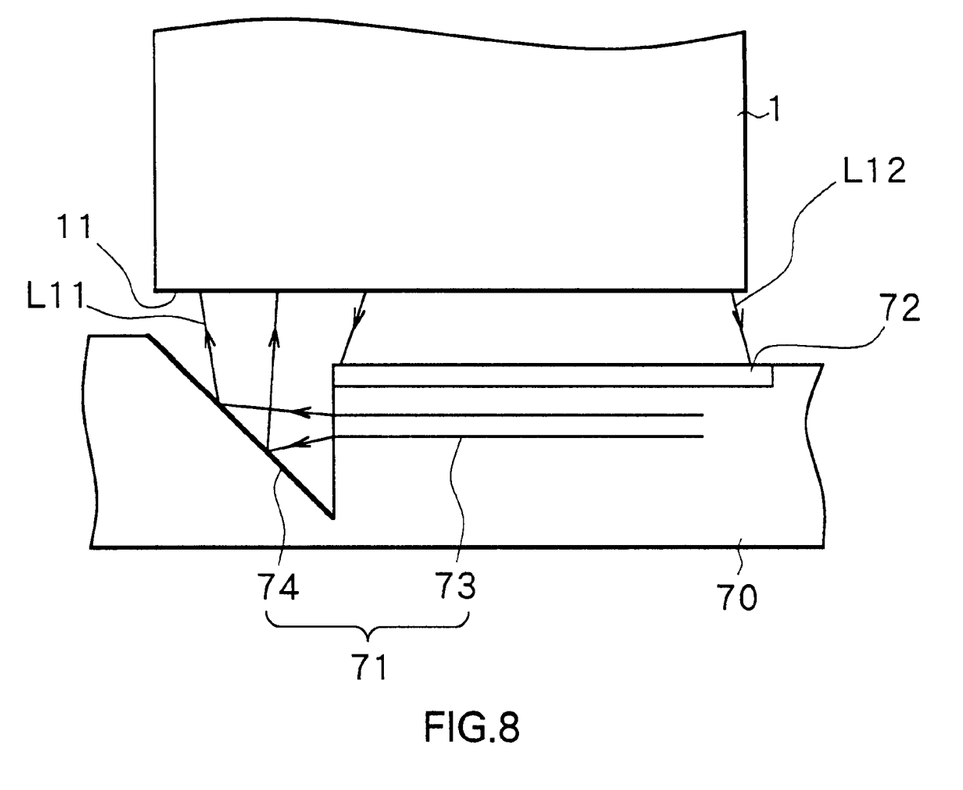
FIG. 8 illustrates the configuration of an optical communications apparatus of an example of the invention.

FIG. 8 illustrates the main part of the configuration of the optical communications apparatus of the example of the invention. The apparatus may comprise a light emitter 71 as a light emitting means and a photodiode 72 as a light receiving means, each integrated on a silicon- or gallium arsenide-based semiconductor substrate 70 so as to achieve monolithic integration.

The light emitter 71 comprises a laser diode 73 including a horizontal resonator inside the substrate 70 for emitting laser light L11 as signal light and a reflection surface 74 which is sloped so as to introduce laser light L11 from the laser diode 73 to the end face 11 of the optical fiber 1. The photodiode 72 is formed on the upper surface of the substrate 70 and receives laser light L12 which is another signal light emitted from the end face 11 of the optical fiber 1.

According to the optical communications apparatus of the example with the configuration as described so far, monolithic integration of the light emitter 71 as the light emitting means and the photodiode 72 as the light receiving means is achieved. As a result, the apparatus of smaller size and lower cost with enhanced reliability is provided, in addition to the effects of the apparatus of the foregoing embodiment.

The present invention is not limited to the foregoing embodiment and example but may be practiced in still other ways. For example, a light emitting diode (LED) may be used for the means for emitting signal light instead of the laser diode.

Although the apparatus of the foregoing embodiment and example includes the optical fiber 1 as the transmission medium, the optical communications apparatus of the invention may comprise the light emitters 2a and 2b and the light receptors 3a and 3b only, without the optical fiber 1. In this case, the light emitters 2a and 2b and the light receptors 3a and 3b may be connected to the optical fiber 1 through forming connectors suitable for the diameter of the optical fiber 1.

Although the invention applied to single-fiber bidirectional communications is described in the foregoing embodiment and example, the apparatus and method of the invention may be applied to any other communications scheme such as unidirectional communications or multi-fiber bidirectional communications.

According to the optical communications apparatus and method of the invention as described so far, signal light for optical communications enters off the center axis of the end face of the optical transmission medium. Optical coupling efficiencies between the light emitting means and the optical transmission medium are thereby improved. In addition, direct optical coupling to the optical transmission medium may be achieved without an optical system. As a result, the configuration of apparatus is simplified and the size is reduced. Furthermore, the light receiving means may be placed at such a distance from the light emitting means that a percentage of stray light components incident on the light receiving means is reduced. Light receiving efficiencies are thus improved by reducing the percentage of stray light components incident on the light receiving means. Simplification and downsizing of the apparatus is achieved while optical coupling efficiencies between the light emitting means and the optical transmission medium and light receiving efficiencies are improved at the same time. Optical communications are thereby performed in satisfactory condition.

In particular, the optical communications apparatus and method of the invention may allow optical coupling of divergent light. As a result, the percentage of return light, that is, signal light from the light emitting means reflecting off the end face of the optical transmission medium and returning to the light emitting means, is reduced. Stable operations of the light emitting means are thereby achieved.

According to the optical communications apparatus and method of the invention, the light emission pattern formed by signal light incident on the end face of the optical transmission medium may take a noncircular form whose minor axis corresponds to the radial direction of the end face. As a result, optical coupling efficiencies between the light emitting means and the optical transmission medium and light receiving efficiencies are further improved. Optical communications are thereby performed in further satisfactory condition.

According to the optical communications apparatus and method of the invention, the light receiving means may be provided, placed together with the light emitting means on the side of the end face of the optical transmission medium. Bidirectional optical communications are thereby performed in satisfactory condition.

According to the optical communications apparatus and method of the invention, the light receiving means may be placed at such a distance from the light emitting means that a percentage of stray light components incident on the light receiving means is reduced. Light receiving efficiencies are thus improved by satisfactorily reducing the percentage of stray light components incident on the light receiving means.

According to the optical communications apparatus, the light emitting means and the light receiving means may be formed through monolithic integration. As a result, the optical communications apparatus of smaller size with stable properties will be provided.

Obviously many modifications and variations of the present invention are possible in the light of the above teachings. It is therefore to be understood that within the scope of the appended claims the invention may be practiced otherwise than as specifically described.

What is claimed is:

1. An optical communications apparatus, comprising:
    a substrate;
    a light emitter formed in the substrate and configured to emit light in a first direction;
    a light reflector formed in the substrate and configured to redirect light emitted from the light emitter along a second direction; and
    a light receptor formed in the substrate at a position between the light emitter and light directed onto the substrate in a third direction essentially opposite the second direction,
    wherein,
        the light emitter, light reflector and light receptor are monolithically integrated in the substrate, and
        the light reflector and light receiver are positioned on opposite sides of a center line of the substrate which is aligned with a center axis of an optical transmission medium associated therewith so that light reflected in said second direction is not aligned with the center axis of the optical transmission medium.

2. The apparatus of claim 1 wherein the substrate is a silicon substrate.

3. The apparatus of claim 1 wherein the substrate is a gallium arsenide substrate.

4. The apparatus of claim 1 wherein the light receptor is a photodiode formed in a top surface of the substrate.

5. The apparatus of claim 1 wherein the light emitter is a light emitting diode.

6. The apparatus of claim 1 wherein the light emitter and light reflector are horizontally spaced apart from each other in the substrate, and the light emitter and light receptor and positioned along a common vertical direction.

7. The apparatus of claim 1 wherein the light emitter is a semiconductor laser.

8. The apparatus of claim 1, wherein the light receptor is positioned in spaced apart relation from the light emitter such that a percentage of incident stray light produced by light emitted from the light emitter and reflected by the light reflector is kept negligible.

9. A method of communicating via an optical transmission medium, the method comprising the steps of:
    providing a light emitting and receiving monolith in which a light emitter;
    emitting light from the light emitter in a first direction;
    reflecting light emitted from the light emitter along a second direction into an optical transmission medium; and
    receiving light from the optical transmission medium with the light receptor, the light received from the optical transmission medium traveling in a third direction essentially opposite the second direction,
    wherein,
        the light receptor is formed in the substrate at a position between the light emitter and the light received from the optical transmission medium,
        the light emitter, light reflector and light receptor are monolithically integrated in the substrate and
        the light reflector and light receiver are positioned on opposite sides of a center line of the substrate which is aligned with a center axis of an optical transmission medium associated therewith so that said light reflected in said second direction is not aligned with the center axis of the optical transmission medium.

10. The apparatus of claim 9 wherein the light emitter and light reflector are horizontally spaced apart from each other in the substrate, and the light emitter and light receptor and positioned along a common vertical direction.

11. The apparatus of claim 9 wherein the light emitter is a semiconductor laser.

12. The apparatus of claim 9, wherein the light receptor is positioned in spaced apart relation from the light emitter such that a percentage of incident stray light produced by light emitted from the light emitter and reflected by the light reflector is kept negligible.

13. An optical communications apparatus comprising:
an optical transmission medium;
a substrate;
a light emitter formed in the substrate and configured to emit light in a first direction;
a light reflector formed in the substrate and configured to redirect light emitted from the light emitter along a second direction; and
a light receptor formed in the substrate at a position between the light emitter and light directed onto the substrate in a third direction essentially opposite the second direction,
wherein,
the light emitter, light reflector and light receptor are monolithically integrated in the substrate,
the light reflector and light receptor are positioned on opposite sides of a center line of the substrate, and
the substrate and optical transmission medium are associated with each other so that the center line of the substrate and a central axis of the optical transmission medium are aligned with respect to each other.

14. The apparatus of claim 13 wherein the substrate is a silicon substrate.

15. The apparatus of claim 13 wherein the substrate is a gallium arsenide substrate.

16. The apparatus of claim 13 wherein the light receptor is a photodiode formed in a top surface of the substrate.

17. The apparatus of claim 13 wherein the light emitter is a light emitting diode.

18. The apparatus of claim 13 wherein the light emitter and light reflector are horizontally spaced apart from each other in the substrate, and the light emitter and light receptor and positioned along a common vertical direction.

19. The apparatus of claim 13 wherein the light emitter is a semiconductor laser.

20. The apparatus of claim 13, wherein the light receptor is positioned in spaced apart relation from the light emitter such that a percentage of incident stray light produced by light emitted from the light emitter and reflected by the light reflector is kept negligible.

* * * * *